US010866761B2

(12) United States Patent
Yoshimoto

(10) Patent No.: US 10,866,761 B2
(45) Date of Patent: Dec. 15, 2020

(54) INFORMATION PROCESSING DEVICE, INFORMATION MANAGEMENT METHOD AND COMPUTER READABLE MEDIUM STORING INFORMATION MANAGING PROGRAM FOR INFORMATION PROCESSING DEVICE

(71) Applicant: KYOCERA Document Solutions Inc., Osaka (JP)

(72) Inventor: Yusuke Yoshimoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/522,523

(22) Filed: Jul. 25, 2019

(65) Prior Publication Data

US 2020/0050392 A1 Feb. 13, 2020

(30) Foreign Application Priority Data

Aug. 8, 2018 (JP) ................................ 2018-149687

(51) Int. Cl.
*G06F 3/06* (2006.01)

(52) U.S. Cl.
CPC .......... *G06F 3/0658* (2013.01); *G06F 3/0604* (2013.01); *G06F 3/0646* (2013.01); *G06F 3/0679* (2013.01)

(58) Field of Classification Search
CPC .................................................... G06F 3/0658
USPC ......................................................... 711/154
See application file for complete search history.

(56) References Cited

U.S. PATENT DOCUMENTS

2003/0191916 A1* 10/2003 McBrearty .......... G06F 11/1464 711/162
2007/0083689 A1* 4/2007 Jeon ...................... G06F 13/385 710/300

FOREIGN PATENT DOCUMENTS

JP 2010-258679 A 11/2010
JP 2016-111496 A 6/2016

* cited by examiner

*Primary Examiner* — Jae U Yu
(74) *Attorney, Agent, or Firm* — Studebaker & Brackett PC

(57) ABSTRACT

An information processing device includes an information processing part performing an information processing with memory information, a first storage device, a storage device connection part connecting with a second storage device, an operation part, and a control part. The control part, in a case where the second storage device is connected to the storage device connection part, stores the memory information stored in the second storage device in the first storage device and removes the memory information from the second storage device, and, in a case where a releasing operation of the connection between the second storage device and the storage device connection part is performed by using the operation part, stores the memory information stored in the first storage device in the second storage device.

6 Claims, 3 Drawing Sheets

| IDENTIFICATION INFORMATION OF USB MEMORY | CONNECTION DAY AND TIME | NUMBER OF FILES |
|---|---|---|
| SN00000001 | 20XX/MM/DD | 10 |
| SN00000002 | 20XX/MM/DD | 20 |
| SN00000003 | 20XX/MM/DD | 30 |
| SN00000004 | 20XX/MM/DD | 40 |
| SN00000005 | 20XX/MM/DD | 50 |
| SN00000006 | 20XX/MM/DD | 60 |

INFORMATION PROCESSING DEVICE, INFORMATION MANAGEMENT METHOD AND COMPUTER READABLE MEDIUM STORING INFORMATION MANAGING PROGRAM FOR INFORMATION PROCESSING DEVICE

INCORPORATION BY REFERENCE

This application is based on and claims the benefit of priority from Japanese Patent application No. 2018-149687 filed on Aug. 8, 2018, the entire contents of which are incorporated herein by reference.

BACKGROUND

The present disclosure relates to a managing device for an information processing device which performs some processing against to information such as data, an information management method used in the information processing device, and a computer readable medium storing an information management program.

An information processing device is a device processing input data and outputting the processed data, and is typically a personal computer or a server computer. As the information processing device, there is an image forming apparatus which has a function of processing input data and outputting the processed data such as a multifunction peripheral or the like.

The image forming apparatus includes a connection terminal connectable a portable external storage device (removable media) such as USB (Universal Serial Bus) flash memory from the outside, and has a function of reading data which indicates document or image from the external storage device connected to the connection terminal, performing print of the document or the image or transmitting by FAX, or the like.

While it is feared that information stored in an external storage device connected to the connection terminal by a user is leaked by somebody removing the external storage device from the connection terminal and carrying the external storage away.

SUMMARY

In accordance with an aspect of the present disclosure, an information processing device includes an information processing part performing an information processing with memory information, a first storage device, a storage device connection part connecting with a second storage device, an operation part, and a control part. The control part, in a case where the second storage device is connected to the storage device connection part, stores the memory information stored in the second storage device in the first storage device and removes the memory information from the second storage device, and, in a case where a releasing operation of the connection between the second storage device and the storage device connection part is performed by using the operation part, stores the memory information stored in the first storage device in the second storage device.

In accordance with an aspect of the present disclosure, an information management method in an information processing device that includes an information processing part performing an information processing with memory information, a first storage device, a storage device connection part connecting with a second storage device, an operation part, and a control part, the information management method includes a connection determining step, an information moving step, a connection release determining step, and an information returning step. In the connection determining step, whether or not the second storage device is connected to the storage device connection part is determined. In the information moving step, in a case where the second storage device is connected to the storage device as a result of the determination in the connection determining step, memory information stored in the second storage device is stored in the first storage device and is removed from the second storage device. In the connection release determining step, whether or not a releasing operation of the connection between the second storage device and the storage device connection part is performed by using the operation part is determined. In the information returning step, in a case where the releasing operation of the connection between the second storage device and the storage device connection part is performed by using the operation part as a result of the determination in the connection release determining step, the memory information stored in the first storage device is stored in the second storage device.

In accordance with an aspect of the present disclosure, a non-transitory computer readable medium stores a program for having a computer of an information processing device execute an information management method, the information processing device includes an information processing part performing an information processing with memory information, a first storage device, a storage device connection part connecting with a second storage device, an operation part, and a control part, the information management method includes a connection determining step, an information moving step, a connection release determining step, and an information returning step. In the connection determining step, whether or not the second storage device is connected to the storage device connection part is determined. In the information moving step, in a case where the second storage device is connected to the storage device as a result of the determination in the connection determining step, memory information stored in the second storage device is stored in the first storage device and is removed from the second storage device. In the connection release determining step, whether or not a releasing operation of the connection between the second storage device and the storage device connection part is performed by using the operation part is determined. In the information returning step, in a case where the releasing operation of the connection between the second storage device and the storage device connection part is performed by using the operation part as a result of the determination in the connection release determining step, the memory information stored in the first storage device is stored in the second storage device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
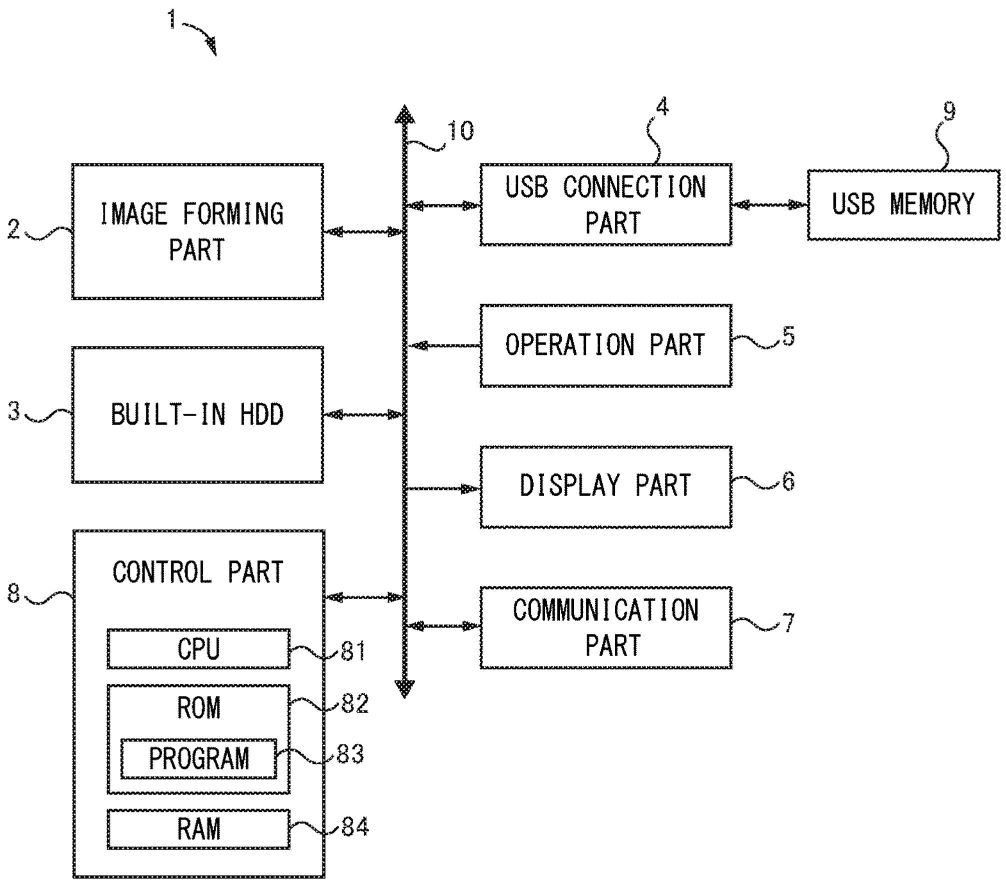
FIG. 1 is a block diagram showing an image forming apparatus as an information processing device according to an embodiment of the present disclosure.

FIG. 1 shows an image forming apparatus 1 as an information processing device according to an embodiment of the present disclosure. The image forming apparatus 1 is, for instance, a multifunction peripheral of an electrographic manner, and has a print function, a copy function, a scanner function, a facsimile function and others. The image forming apparatus 1, as shown in FIG. 1, includes an image forming part 2 as an information processing part, a built-in HDD (Hard Disk Drive) 3 as a first storage device, a USB connection part 4 as a storage device connection part, an operation part 5, a display part 6, a communication part 7, and a control part 8. The image forming part 2, the built-in HDD 3, the USB connection part 4, the operation part 5, the display part 6, the communication part 7, and the control part 8 are connected each other via a bus 10.

The image forming part 2 has an image processing device generating a print image, a facsimile image or the like based on document data, image data or the like, and a print mechanism printing the print image on a sheet. The print mechanism includes, for instance, a photosensitive drum, a charging device, an exposure device, a development device, a transferring device, a fixing device, a sheet conveying mechanism, a sheet house, toner house and others.

The built-in HDD 3 is built in a case of the image forming apparatus 1. The USB connection part 4 has an electric circuit and a USB connection terminal for connecting a USB memory 9 as a second storage device to the bus 10. For example, the USB connection terminal is fixed in the case of the image forming apparatus 1, thereby it is possible to put on and remove the USB memory 9 from the outside of the case.

The operation part 5 is a part used for operating the image forming apparatus 1 by a user, and, for instance, has a panel on which a plurality of buttons are arranged. The operation part 5 may be constituted by a touch panel. The display part 6 is, for instance, a liquid crystal display. The connection part 7 is a circuit for mutually connecting between the image forming apparatus 1 and other devices via a computer network. The connection part 7 includes a circuit which connects the image forming apparatus 1 to a phone line in order to perform a transmitting and receiving faxes. For example, at the time of performing the transmitting faxes, the facsimile image generated by the image processing device of the image forming part 2 is transmitted toward a destination of transmitting from the communication part 7.

The control part 8 includes a CPU (Central Processing Unit) 81 as a computer of the image processing device 1. The control part 8 has storage mediums (computer readable mediums) such as a ROM (Read Only Memory) 82 storing programs 83 and so on and a RAM (Random Access Memory) 84 used as a main memory device and others. The control part 8 controls the image forming part 2, the built-in HDD 3, the USB connection part 4, the display part 6, the communication part 7 and others based on operations against to the operation part 5 by user or results of detections by various censors installed in a case of the image forming apparatus 1. And the control part 8 performs an information management processing and an information recovery processing described later by, for example, executing the programs 83 stored in the ROM 82.

Figure 2:
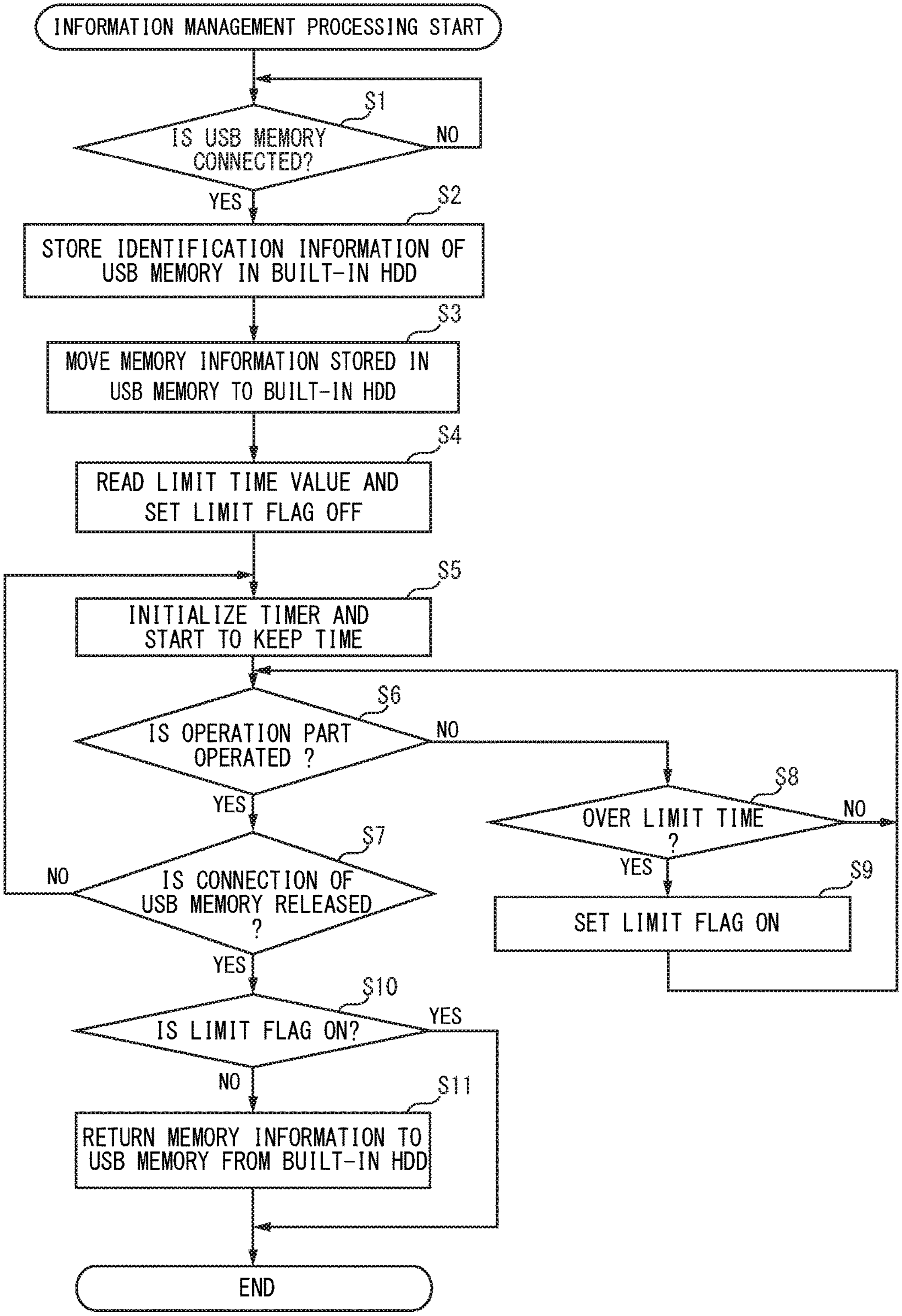
FIG. 2 is a flow chart showing an information management processing in the image forming apparatus as the information processing device according to the embodiment of the present disclosure.

FIG. 2 illustrates the information management processing. In the information management processing, the control 8 performs following process.

(1) In a case where the USB memory 9 is connected to the USB connection part 4, memory information stored in the USB memory 9 is stored in the built-in HDD 3 and the memory information is removed from the USB memory 9. Such processes are performed at the time when the USB memory 9 is connected to the USB connection part 4.

(2) In a case where a releasing operation of the connection between the USB memory 9 and the USB connection part 4 is performed by using the operation part 5, the memory information stored in the built-in HDD 3 is stored in the USB memory 9. However, in a case where the releasing operation of the connection between the USB memory 9 and the USB connection part 4 is performed after a non-operated state of the operation part 5 continues for over a predetermined time (a limit time value) from the USB memory 9 being connected to the USB connection part 4, the memory information stored in the built-in HDD 3 is not stored in the USB memory 9.

Hereby, the "memory information" is information which the user can normally write or rewrite in a USB memory (the second storage device) or remove from the USB memory. If only the memory information is such information, it does not matter what kind of the memory information is. The memory information is not limited to data which the image forming apparatus 1 can perform print or the like by the image formation apparatus 1, may be data which the image forming apparatus 1 cannot perform print or the like or a program. On the other hand, an information stored in advance in the USB memory so as not to be able to rewrite, such as an identification information of the USB memory is not the memory information as used herein.

The specific contents of information management processing will be described as follows. As shown in FIG. 2, the control part 8 always monitors whether or not the USB memory 9 is connected to the USB connection part 4, while the image forming apparatus 1 is activated (step S1). In a case where a user connects the USB memory 9 to the USB connection part 4, the control part 8 recognizes the USB memory 9 is connected to the USB connection part 4 (step S1: YES).

Next, the control part 8 reads the identification information of the connected USB memory 9 from the USB memory 9, and stores the read identification information together with a date and time information which indicates the date and time when the USB memory 9 is connected in the built-in HDD 3 (step S2).

Next, the control part 8 moves the memory information stored in the connected USB memory 9 to the built-in HDD 3 (step S3). That is, the control part 8 reads all of the memory information stored in the connected USB memory 9, stores all of the memory information in the built-in HDD 3, and removes all of the memory information from the connected USB memory 9. The control part 8 associates the memory information with the identification information read in the step S2, and stores the memory information and the identification information in the built-in HDD 3.

Next, the control part 8 reads the limit time value from the built-in HDD 3, and sets a limit flag off (step S4).

Next, the control part 8 initializes a timer, and starts clocking of the timer (step S5). In addition, the timer is installed in the CPU 81 of the control part 8.

Next, the control part 8 determines whether or not the operation part 5 is operated by the user (step S6). In a case where the operation part 5 is operated by the user (step S6: YES), the control part 8 determines whether or not the operation is the releasing operation of the connection between the USB memory 9 and the USB connection part 4 (step S7). Then, in a case where the operation of the operation part 5 by the user is not the releasing operation of the connection between the USB memory 9 and the USB connection part 4 (step S7: NO), the control part 8 returns processing to the step S5, and starts clocking of the timer again after initializing the timer. Thereby, the clocking of the timer is reset each time when other operations than the releasing operation of the connection between the USB memory 9 and the USB connection part 4 are performed by the user.

On the other hand, the clocking of the timer proceeds while the operation part 5 is not operated. The control part 8 determines whether or the non-operated state of the operation part 5 continues beyond the limit time value. The non-operated state of the operation part 5 continues beyond the limit time value (step S6: NO, step S8: YES), the control part 8 sets the limit flag on (step S9). Hereby, the limit time value is a time estimated the user leaves the image forming apparatus 1. In a case where the non-operated state of the operation part 5 continues beyond time for approximately form one minute to five minutes, it is estimated that the user leaves the image forming apparatus 1. Therefore, it is preferred that the limit time value is set, for instance, around from one minute to five minutes. And, the limit time value may be set an optional value by a user in advance. Moreover, the limit time value is stored in, for example, the built-in HDD 3, and is read by the control part 8 in the step S4 as described above.

On the other hand, the operation part 5 is operated by the user, and if the operation is the releasing operation of the connection between the USB memory 9 and the USB connection part 4 (step S7: YES), the control part 8 releases the connection between the USB memory 9 and the USB connection part 4. Then, the control part 8 determines whether or not the control flag is on (step S10). And, in a case where the control flag is not on (step S10: NO), the control part 8 returns the memory information to the connected USB memory 9 from the built-in HDD 3 (step S11). That is, in the step 11, first, the control part 8 confirms whether or not the identification information of the USB memory 9 read in the step S2 coincides with the identification information of the USB memory 9 being currently connected to the USB connection part 4. Next, the control part 8, based on the identification information of the USB memory 9 read in the step S2, specifies the memory information moved to the built-in HDD 3 from the USB memory 9 in the step S3. Next, the control part 8 stores all of the specified memory information in the USB memory 9 and removes the specified memory information from the built-in HDD 3. The control part 8 removes the identification information of the USB memory 9, which is read from the USB memory 9 and is stored in the built-in HDD 3 in the step S2, from the built-in HDD 3. And then, the user can safely remove the USB memory 9 from the USB connection part 4. However, in a case where, in step S11, the identification information of the USB memory 9 read in the step S2 does not coincide with the identification information of the USB memory 9 being currently connected to the USB connection part 4, the control part 8 does not perform processing for returning the memory information to the USB memory 9 from the built-in HDD 3. In such a case, the memory information and the identification information of the USB memory 9 are held in the built-in HDD 3.

On the other hand, in a case where the control flag is on (step S10: YES), the control part 8 does not perform the processing for returning the memory information to the connected USB memory 9 from the built-in HDD 3. In this case, the memory information and the identification information of the USB memory 9 are held in the built-in HDD 3. And, in the USB memory 9, a state that the memory information is removed is kept.

However, while the USB memory 9 is connecting to the USB connection part 4, document data or the like included in the memory information stored in the built-in HDD 3 is used in processing of the image forming part 2. For instance, in a case where the user operates the operation part 5 to select document data included in the memory information and to make the image forming apparatus 1 perform print of documents while the USB memory 9 is connecting to the USB connection part 4, the document data included in the memory information stored in the built-in HDD 3 in the step S3 is used in the processing of print.

The memory information stored in the built-in HDD 3 is modified while the USB memory 9 is connecting to the USB connection part 4, the modified memory information is returned to the USB memory 9 from the built-in HDD 3. For instance, in a case where the user uses the scanner function to read a document and adds a data of the document in the memory information, the data of the document is added in the memory information stored in the built-in HDD 3 in the step 3. In such a case, in the step S11, the memory information in which the data of the document is added stored in the USB memory 9 when the memory information stored in the built-in HDD 3 is stored in the USB memory 9.

Figures 3, 4:
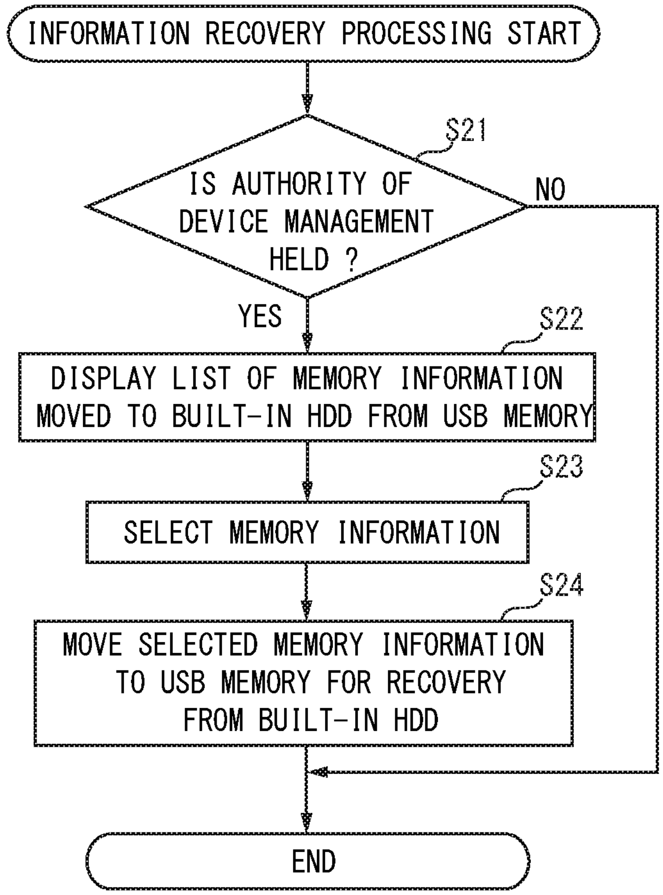
FIG. 3 is a flow chart showing an information recovery processing in the image forming apparatus as the information processing device according to the embodiment of the present disclosure.
FIG. 4 is a table showing a list of memory information stored in a built-in HDD in the image forming apparatus as the information processing device according to the embodiment of the present disclosure.

FIG. 3 shows the information recovery processing. The information recovery processing is a processing supposed that the memory information moved to the built-in HDD 3 from the USB memory 9 is returned to the user in a case where the USB memory 9 is carried away by somebody after the USB memory 9 is connected to the USB connection part 4 and the memory information is moved to the built-in HDD 3 from the USB memory 9. Only a user with authority of device management of the image forming apparatus 1 can perform this process.

The specific contents of the information recovery processing are as follows. For example, it is assumed that the user A without the authority of device management requests to recover the memory information to the user B with the authority of device management and hands a USB memory (hereinafter, called "a USB memory for recovery") as a storage medium for recovering the memory information to the user B. In this case, the user B logs in the image forming apparatus 1 by operating the operation part 5, and connects the USB memory for recovery handed from the user A to the USB connection part 4, and inputs an instruction of performing of the information recovery processing to the image forming apparatus 1. In response to this request, the control part 8 starts to perform the information recovery processing. After the information recovery processing starts, as shown in FIG. 3, the control part 8 first determines whether or not the logged-in user has the authority of device management (step S21). In a case where the logged-in user does not have the authority of device management (step S21: No), the control part 8 finishes the information recovery processing.

In a case where the logged-in user has the authority of device management (step S21: Yes), the control part 8 displays a list of the memory information which is moved to the built-in HDD 3 from a USB memory in the past and is held in the built-in HDD 3, on the display part 6 (step S22). The memory information held in the built-in HDD 3 is information that has not been returned to a USB memory from the built-in HDD 3 in the information management processing.

Hereby, FIG. 4 indicates an example of the list of the memory information displayed on the display part 6 in the step S22. As shown in FIG. 4, in the list of the memory information, the identification information of a USB memory which is a source of moving the memory information, the date and time when the USB memory which is a source of moving the memory information connected to the USB connection part 4, and the number of files included in the memory information are displayed.

The user A informs the user B of the date and time when the USB memory 9 is connected and the number of files included in the memory information. The user B can specify the memory information of the user A by searching in the list based on such information informed from the user A. However, in a case where the user B cannot get appropriate information about the date and time when the USB memory 9 is connected or the number of files included in the memory information from the user A because the memorize of the user A is foggy, it is considered that the user B, as long as the user B can get general information about them, can specify the memory information of the user A by comparing the connection date and time of a plurality of the memory information in the list with each other or by comparing the number of files relevant to the plurality of the memory information in the list with each other.

Information available to estimate the content of the memory information such as a file name of each file included the memory information and others is not displayed in the list of the memory information. Thus, it is possible to prevent a secret information of an owner of the memory information from being revealed and to protect a privacy of the owner of the memory information.

The user B operates the operation 5 to designate the memory information of the user A from the list of the memory information. In accordance with this designation, the control part 8 selects the memory information of the user A (step S23).

Next, the control part 8 moves the selected memory information to the USB memory for recovery from the built-in HDD 3 (step S24). That is, the control part 8 reads the selected memory information from the built-in HDD 3, stores the selected memory information in the USB memory for recovery, and removes the selected memory information or the like from the built-in HDD 3. And then, the user B removes the USB memory for recovery from the USB connection part 4, and hands the USB memory for recovery to the user A.

As described before, in accordance with the image forming apparatus 1 according to the embodiment of the present disclosure, in the case where the USB memory 9 is connected to the USB connection part 4, the memory information stored in the USB memory 9 is stored in the built-in HDD 3 and the memory information is removed from the USB memory 9 (that is, the memory information is moved to the built-in HDD 3 from the USB memory 9). Thus, even if somebody removes the USB memory 9 connected to the USB connection part 4 of the image forming apparatus 1 from the USB connection part 4 and carries the USB memory 9 away without the releasing operation of the connection between the USB memory 9 and the USB connection part 4, the person cannot get the memory information stored in the USB memory 9. Accordingly, it is possible to prevent the memory information stored in the USB memory 9 from being leaked.

Moreover, in according with the image forming apparatus 1, at the time of the USB memory 9 is connected to the USB connection part 4, the memory information is moved to the built-in HDD 3 from the USB memory 9. Therefore, after a user connects the USB memory 9 to the USB connection apart 4, even if a person other than the user carries the USB memory 9 away without the releasing operation of the connection between the USB memory 9 and the USB connection part 4 while the user do another work in front of the image forming apparatus 1, the person who carried the USB memory 9 away cannot get the memory information. Accordingly, in accordance with the image forming apparatus 1 according to the embodiment of the present disclosure, it is possible to increase certainty of preventing information leakage through the external storage device such as the USB memory as compared with general techniques of preventing information leakage.

Moreover, in according with the image forming apparatus 1, while the USB memory 9 is connecting to the USB connection part 4, memory information is never stored in the USB memory 9. Thereby, after a user connects the USB memory 9 to the USB connection part 4, even if a person other than the user carries the USB memory 9 away without the releasing operation of the connection between the USB memory 9 and the USB connection part 4 in a state where the user leaves the image forming apparatus 1 without starting to perform a processing such as print by the image forming apparatus 1, the person who carried the USB memory 9 away cannot get the memory information. Accordingly, in accordance with the image forming apparatus 1 according to the embodiment of the present disclosure, it is possible to increase certainty of preventing information leakage through the external storage device such as the USB memory as compared with general techniques of preventing information leakage.

Moreover, in the image forming apparatus 1 according to the embodiment of the present disclosure, in a case where the releasing operation of the connection between the USB memory 9 and the USB connection part 4 is performed after connecting the USB memory 9 to the USB connection part 4, the memory information is automatically returned to the USB memory 9 from the built-in HDD 3. Accordingly, for example, a user can do smoothly such works as the user connects the USB memory 9 to the USB connection part 4, performs print of document or the like by the image forming apparatus 1 with document data or the like included in the memory information, performs the releasing operation of the connection between the USB memory 9 and the USB connection part 4, removes the USB memory 9 from the USB connection part 4, connects the USB memory 9 to a personal computer or the like, and performs other processing with the memory information stored in the USB memory 9 by using the personal computer or the like.

Moreover, in according with the image forming apparatus 1 according to the embodiment of the present disclosure, in a case where the releasing operation of the connection between the USB memory 9 and the USB connection part 4 is performed after the non-operated state of the operation part 5 continues for over the predetermined time (the limit time value) from connecting the USB memory 9 to the USB connection part 4, the memory information is not returned to the USB memory 9 from the built-in HDD 3. Thereby, after a user connects the USB memory 9 to the USB connection part 4 and leaves the image forming apparatus 1 without removing the USB memory 9 from the USB connection part 4, even if a person other than the user performs the releasing operation of the connection between the USB memory 9 and the USB connection part 4 and carries the USB memory 9 away, the person carrying the USB memory 9 away cannot get the memory information stored in the USB memory 9. Accordingly, it is possible to prevent the memory information stored in the USB memory 9 from being leaked due to forgetting to remove the USB memory 9.

Moreover, the image forming apparatus 1 according to the embodiment of the present disclosure reads the identification information of a USB memory connected to the USB connection part 4, and stores the read identification information in the built-in HDD 3. Thereby, the image forming apparatus 1 can recognize correspondence between the memory information stored in the built-in HDD 3 and the USB memory connected to the USB connection part 4 based on the identification information of the USB memory stored in the built-in HDD 3. And the image forming apparatus 1 can recognize whether or not the USB memory connected to the USB connection part 4 at the time of connecting the USB memory to the USB connection part 4 coincides with the USB memory connected to the USB connection part 4 at the time of releasing the connection between the USB memory 9 and the USB connection part 4. Thereby, after a user connects the USB memory 9 to the USB connection part 4, even if a person other than the user removes the USB memory 9 from the USB connection part 4 and connects another USB memory to the USB connection part 4, the person cannot store the memory information stored in the built-in HDD 3 in the other USB memory. Accordingly, it is possible to prevent carrying the memory information away by using the other USB memory.

Moreover, in according with the image forming apparatus 1 according to the embodiment of the present disclosure, for example, after the user A without the authority of device management connects the USB memory 9 to the USB connection part 4, even if a person other than the user A carries the USB memory 9 away, the user B with the authority of device management can return the memory information to the user A by performing the information recovery processing. Thereby, it is possible to prevent the user A from losing the memory information due to carrying the USB memory 9 away.

In addition, in the above embodiment, the image forming apparatus 1 of an electrographic manner is given as an example of the information processing device. However, the information processing device of the present disclosure may be an image forming apparatus of another print manner such as an ink-jet manner, a thermal transfer manner or the like. Moreover, in the above embodiment, a multifunction peripheral is given as an example of the information processing device. However, the information processing device of the present disclosure may be another image forming apparatus such as a printer, a copying machine, a scanner, a facsimile or the like. Furthermore, the information processing device of the present disclosure is not limited to an image forming apparatus, may be a server computer, a personal computer or the like.

Moreover, in the above embodiment, although the HDD is given as an example of the first storage device, the first storage device is not limited by this. Another external storage device having a non-volatile rewritable recording medium such as an SSD (Solid State Drive) may be used as the first storage device. Moreover, the above embodiment cites, as an example, a case where the first storage device is built-in the information processing device. However, the first storage device may be the external storage device which is outside of the information processing device and is connected to the information processing device, such as an external HDD, an external SSD or the like. Moreover, the above embodiment supposes the first storage device is a stationary and large-capacity storage device. However, the first storage device may be a portable external storage device or a portable external storage medium. In addition, in a case where the portable external storage device or the portable external storage medium is used as the first storage device, it is necessary to install the portable external storage device or the portable external storage medium on the information processing device so that they are not removed easily. Moreover, the first storage device may be an external storage device installed on another device which is connected to the information processing device via a computer network.

Moreover, in the above embodiment, although the USB memory is given as an example of the second storage device, the second storage device is not limited by this. Another portable external storage device, another portable external storage medium, a removable storage or a removable medium can be used as the second storage device. For instance, the second storage device may be a memory card, a portable HDD, a portable SSD or the like. And a portable mobile functioning as an external storage device may be used as the second storage device.

Furthermore, in the information management processing shown as FIG. 2, the step S1 is a specific example of a connection determining step, and the step S2 is a specific example of an identification information reading step, and the steps S5-S9 are a specific example of a connection release determining step, and the step S10 and S11 are a specific example of an information returning step.

Although the specific embodiment is described in the present disclosure, the present disclosure is not limited by the above embodiment. The person skilled in the art can modify the above embodiment without departing from the scope and the major point of the present disclosure.

The invention claimed is:

1. An information processing device comprising:

an information processing part performing an information processing with memory information;

a first storage device;

a storage device connection part connecting with a second storage device;

an operation part; and a control part, wherein, the control part, in a case where the second storage device is connected to the storage device connection part, stores the memory information stored in the second storage device in the first storage device and removes the memory information from the second storage device, and, in a case where a releasing operation of the connection between the second storage device and the storage device connection part is performed by using the operation part, stores the memory information stored in the first storage device in the second storage device, and the control part does not store, in a case where the releasing operation of the connection between the second storage device and the storage device connection part is performed after a non-operated state of the operation part continues for over a predetermined time from connecting the second storage device to the storage device connection part, the memory information in the first storage device in the second storage device.

2. The information processing device according to claim 1, wherein the predetermined time is capable of being set by a user in advance.

3. The information processing device according to claim 1, wherein the control part reads an identification information of the second storage device connected to the storage device connection part, and stores the identification information in the first storage device.

4. The information processing device according to claim 3, wherein the control part, in a case where the second storage device is connected to the storage device connection part, reads the identification information of the second storage device connected to the storage device connection part, and stores the identification information together with the memory information stored in the second storage device in the first storage device.

5. An information processing device comprising:

an information processing part performing an information processing with memory information;

a first storage device;

a storage device connection part connecting with a second storage device;

an operation part; and a control part, wherein, the control part, in a case where the second storage device is connected to the storage device connection part, stores the memory information stored in the second storage device in the first storage device and removes the memory information from the second storage device, and, in a case where a releasing operation of the connection between the second storage device and the storage device connection part is performed by using the operation part, stores the memory information stored in the first storage device in the second storage device, the control part reads an identification information of the second storage device connected to the storage device connection part, and stores the identification information in the first storage device, the control part, in a case where the second storage device is connected to the storage device connection part, reads the identification information of the second storage device connected to the storage device connection part, and stores the identification information together with the memory information stored in the second storage device in the first storage device, and the control part, in a case where the releasing operation of the connection between the second storage device and the storage device connection part is performed by using the operation part, stores the memory information specified based on the identification information among the memory information stored in the first storage device in the second storage device.

6. An information processing device comprising:

an information processing part performing an information processing with memory information;

a first storage device;

a storage device connection part connecting with a second storage device;

an operation part; and a control part, wherein, the control part, in a case where the second storage device is connected to the storage device connection part, stores the memory information stored in the second storage device in the first storage device and removes the memory information from the second storage device, and, in a case where a releasing operation of the connection between the second storage device and the storage device connection part is performed by using the operation part, stores the memory information stored in the first storage device in the second storage device, the control part reads an identification information of the second storage device connected to the storage device connection part, and stores the identification information in the first storage device, the control part, in a case where the second storage device is connected to the storage device connection part, reads the identification information of the second storage device connected to the storage device connection part, and stores the identification information together with the memory information stored in the second storage device in the first storage device, and the control part, in a case where the identification information read from the second storage device connected to the storage device connection part and the identification information stored in the first storage device do not coincide when the releasing operation of the connection between the second storage device and the storage device connection part is performed by using the operation part, does not stored the memory information stored in the first storage device in the second storage device.

* * * * *